(12) United States Patent
Stattin et al.

(10) Patent No.: US 8,837,403 B2
(45) Date of Patent: Sep. 16, 2014

(54) METHODS AND ARRANGEMENTS FOR SCHEDULING RADIO RESOURCES IN A WIRELESS COMMUNICATION SYSTEM

(75) Inventors: Magnus Stattin, Spanga (SE); Henning Wiemann, Aachen (DE); Riikka Susitaival, Helsinki (FI); Sara Landström, Luleå (SE); Stefan Wänstedt, Luleå (SE); Mårten Ericson, Luleå (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/392,224

(22) PCT Filed: Jul. 16, 2010

(86) PCT No.: PCT/SE2010/050849
§ 371 (c)(1),
(2), (4) Date: Feb. 24, 2012

(87) PCT Pub. No.: WO2011/025434
PCT Pub. Date: Mar. 3, 2011

(65) Prior Publication Data
US 2012/0176984 A1 Jul. 12, 2012

Related U.S. Application Data

(60) Provisional application No. 61/252,004, filed on Oct. 15, 2009, provisional application No. 61/253,901, filed on Oct. 22, 2009.

(30) Foreign Application Priority Data

Aug. 31, 2009 (WO) ............... PCT/SE2009/050981
Aug. 31, 2009 (WO) ............... PCT/SE2009/050982

(51) Int. Cl.
*H04W 4/00* (2009.01)
*H04W 72/12* (2009.01)

(52) U.S. Cl.
CPC ............... *H04W 72/1284* (2013.01)
USPC .......................................... 370/329

(58) Field of Classification Search
USPC ............... 370/328, 329; 455/422.1
See application file for complete search history.

(56) References Cited

U.S. PATENT DOCUMENTS

2008/0069035 A1* 3/2008 Pinheiro et al. ............... 370/328
2008/0095055 A1* 4/2008 Moulsley et al. ............... 370/234

(Continued)

FOREIGN PATENT DOCUMENTS

EP          1 890 422 A2   2/2008
WO    WO 2007/024120 A1   3/2007

OTHER PUBLICATIONS

Notification of Transmittal of the International Preliminary Report on Patentability, PCT/SE2010/050849, Dec. 1, 2011, 7 pages.

(Continued)

*Primary Examiner* — Chirag Shah
*Assistant Examiner* — Jael Ulysse
(74) *Attorney, Agent, or Firm* — Myers Bigel Sibley & Sajovec

(57) ABSTRACT

Methods and arrangements in a base station are provided for scheduling radio resources to a user equipment. A time offset value is received that is associated with the moment of time when a frame of data was generated in the user equipment buffer. The moment of time when the frame of data was generated in the user equipment buffer is determined, based on the received time offset value. Thus, the buffer state of the user equipment buffer is predicted by using the determined moment of time when the frame of data was generated in the user equipment buffer. Radio resources are granted to the user equipment, based on the predicted buffer state of the user equipment buffer. Methods and arrangements in a user equipment for assisting the base station in scheduling radio resources are also provided herein.

23 Claims, 7 Drawing Sheets

(56) References Cited

U.S. PATENT DOCUMENTS

| | | | |
|---|---|---|---|
| 2008/0119181 A1* | 5/2008 | Suzuki et al. | 455/422.1 |
| 2008/0137601 A1* | 6/2008 | Sung et al. | 370/329 |
| 2008/0212524 A1* | 9/2008 | Niwano | 370/329 |
| 2008/0232260 A1* | 9/2008 | Yeo et al. | 370/242 |
| 2008/0267118 A1* | 10/2008 | Cai et al. | 370/329 |
| 2009/0225739 A1* | 9/2009 | Yeo et al. | 370/345 |
| 2009/0303954 A1* | 12/2009 | Guo | 370/329 |
| 2010/0150082 A1* | 6/2010 | Shin et al. | 370/329 |
| 2010/0254321 A1* | 10/2010 | Kim et al. | 370/329 |
| 2011/0299497 A1* | 12/2011 | Pinheiro et al. | 370/329 |
| 2012/0281660 A1* | 11/2012 | Pinheiro et al. | 370/329 |

OTHER PUBLICATIONS

Notification of Transmittal of the International Search Report and the Written Opinion of the International Searching Authority, or the Declaration, PCT/SE2010/050849, Dec. 13, 2010, 12 pages.

Written Opinion of the International Searching Authority, PCT/SE2010/050849, Sep. 6, 2011, 9 pages.

* cited by examiner

METHODS AND ARRANGEMENTS FOR SCHEDULING RADIO RESOURCES IN A WIRELESS COMMUNICATION SYSTEM

CROSS-REFERENCE TO RELATED APPLICATION

This application is a 35 U.S.C. §371 national stage application of PCT International Application No. PCT/SE2010/050849, filed on Jul. 16, 2010, which claims priority to PCT/SE2009/050981, filed on Aug. 31, 2009; PCT/SE2009/050982, filed on Aug. 31, 2009; U.S. Provisional Application Ser. No. 61/252,004, filed on Oct. 15, 2009; and U.S. Provisional Application Ser. No. 61/253,901, filed on Oct. 22, 2009, the disclosures and content of which are incorporated by reference herein as if set forth in their entirety. The above-referenced PCT International Application was published in the English language as International Publication No. WO 2011/025434 on Mar. 3, 2011.

FIELD

The present invention relates to a method and arrangement in a user equipment and a method and arrangement in a base station. More in particular, it relates to a mechanism for uplink scheduling within a wireless communication system.

BACKGROUND

In Long Term Evolution (LTE), the scheduler is placed in the eNodeB and the Medium Access Control (MAC) layer. The scheduler assigns radio resources, also called Resource Blocks (RB). The user equipments find out where to listen or where to send by listening for downlink assignments and uplink grants on the Physical Downlink Control Channel (PDCCH). Also, information concerning which transport format to use is comprised within the assignment and grant, respectively.

The radio downlink is the transmission path from a base station, e.g. an eNodeB to a terminal, or a User Equipment (UE) as the terminal also may be referred to as. The uplink is the inverse of a downlink, i.e. the transmission path from the terminal to the base station.

However, as the eNodeB schedules uplink transmissions, while the buffers are located in the terminal or user equipment (UE), the terminal has to notify the eNodeB that it has data that it would like to transmit. If notification is not possible, the eNodeB has to schedule the user equipment blindly without knowledge as to whether there is data in the buffer of the UE. The terminal supplies the eNodeB with information about the data in its buffers using two mechanisms; a 1-bit Scheduling Request (SR) or Buffer Status Reports (BSR). Scheduling requests are transmitted on a control channel such as e.g. Physical Uplink Control Channel (PUCCH) or Random Access Channel (RACH). This process is illustrated in FIG. 1, which depicts prior art uplink scheduling. Buffer status reports are however transmitted on a data channel such as Physical Uplink Shared Channel (PUSCH) mostly together with user data.

If the terminal has a valid PUCCH resource for scheduling request configured in any Transmission Time Interval (TTI), it sends a one bit scheduling request when the timing is right, that is, when the PUCCH resources are available. Otherwise it initiates a random access procedure and cancels all pending scheduling requests.

The terminal is only allowed to use the PUCCH for the SR at predefined points in time determined by the Dedicated Scheduling Request (D-SR) interval. The delay between the actual generation time of a data packet such as e.g. a Voice over the Internet Protocol (VoIP) packet and the sending of the D-SR can thus become as large as the D-SR interval. It is to be noticed that VoIP is here used merely as a clarifying example of a service; the present invention is by no means limited to be used only for VoIP, but may bring advantages for any kind of service.

In the present context, the generation time of data packets or data frames, i e frames of data, is defined as the actual time when the data was put in the transmit buffer at the terminal. Scheduling request arrival time is defined as the time when the eNodeB receives a scheduling request. Similarly, data arrival time may be defined as the time when the eNodeB receives a data packet or data frame transmitted by the UE.

When using service aware buffer estimation such as e.g. VoIP aware buffer estimation, the generation time is valuable to obtain the shortest possible delay for the data packet or data frame.

In VoIP, the buffer estimation algorithm moves between two states, Silence Insertion Descriptor (SID) and TALK and a state change should preferably occur when the codec switches between the corresponding states. The TALK state is a proactive buffer estimation state which guesses when the next voice frame, i e frame of voice data, or data packet comprising voice data will arrive and which size it will have, while the SID state is a passive state that expects Scheduling Requests when data has arrived for a user.

As voice frames arrive every 20 ms to the terminal buffer using for instance Adaptive Multi Rate (AMR), the better the algorithm knows the generation time, the more exact it will predict the buffer size. This way the delay of the voice frame can be minimized.

The larger the D-SR interval is, the larger the difference between the generation time of the VoIP packet and the arrival time when the eNodeB notes the data arrival. This makes it harder to accurately predict the buffer state or buffer size and schedule delay-sensitive services, increasing the need for explicit signalling and decreasing the efficiency of the uplink assignments.

The VoIP aware buffer estimator uses the arrival time of the D-SR, deducted by the processing time, as the VoIP packet generation time. This time can be very different from the actual VoIP packet generation time. Furthermore, the eNodeB scheduler does not have correct packet delay information and may schedule the VoIP packet too late, especially in scenarios where the required VoIP delay is relatively short. In addition, the user equipment may need to be active and monitor PDCCH during the time from packet generation time until scheduling event. Long delay between these events consumes battery of the user equipment.

It is to be noted that the scheduling request is a scarce resource and thus the D-SR interval can be relatively long compared to the time between generation of voice packets at the terminal.

LTE provides a mechanism referred to as Discontinuous Reception (DRX) which intends to reduce the user equipments' battery consumption by allowing them to disable their receiver chain under certain conditions. According to the current LTE specification, a user equipment must leave DRX, i.e. enable the receiver chain and monitor PDCCH, upon a scheduling request trigger which is typically before the scheduling request is sent. For certain services such as VoIP this requirement bears the risk that the user equipment can hardly ever enter DRX. This is due to the fact that the eNodeB has no means to determine the time when the data frame, e.g. VoIP packet, entered the buffer and triggered the scheduling request.

US 2008/0119181 A1 concerns a radio base station, a radio communication terminal, and a radio communication system that can utilize broadband resources even if many packets of different sizes and different QoS requirements are mixed when sent and received. When a data transmission request is sent from a radio terminal to a base station, at least one of a data transmission duration time, a transmission data transmission interval, and an expiration time is included in the data transmission request. The base station receives data transmission requests from multiple radio terminals, schedules the data transmission requests from multiple radio terminals, assigns bandwidths to the multiple radio terminals based on the duration time, transmission interval, and expiration time included in each of the data transmission requests and continues the assignment of bandwidths to the radio terminals during the duration time based on the received duration time.

WO 2007/024120 A1 relates to a resource request and a packet scheduling method for uplink traffic in a mobile communication system. For efficient scheduling of the uplink traffic, a base station and user equipment determines a scheduling method according to characteristics of the traffic when performing negotiation therebetween. The traffic may be classified into traffic that generating a fixed-size packet in a periodical time interval, traffic that generates a variable-size packet in a periodic time interval, and traffic that generates a variable-size packet in a random time interval, and then scheduled.

SUMMARY

It is an object of at least some embodiments of the present disclosure to obviate at least some of the above disadvantages and provide an improved performance within a wireless communication system.

According to a first embodiment, the object is achieved by a method in a user equipment for assisting a base station in scheduling radio resources. The base station and the user equipment are comprised within a wireless communication system. The user equipment comprises a buffer arranged to buffer frames comprising data. The user equipment may be arranged to notify the base station about data being available for transmission. The user equipment may notify the base station by sending a scheduling request that may be sent only at certain dedicated moments in time. Those certain dedicated moments in time are separated by a predetermined time interval. Also, the user equipment is arranged to send the frames comprising data primarily after being scheduled resources by the base station. Radio resources may be scheduled dynamically i.e. valid for a single transmission attempt or persistently, i.e. valid periodically, according to some embodiments. According to the present method, it is detected when a frame of data is generated in the buffer. The method also comprises computing a time offset value based on the time difference between the moment when the frame of data was generated in the buffer and a timing reference. The timing reference may be known to or possible to calculate or estimate by the user equipment and the base station. Such a timing reference may for example be the moment when the scheduling request was sent or, if not sent, the moment when there is a next or following scheduling request opportunity. Alternatively, if the user equipment has no valid scheduling request resources, the time offset may be computed as the time difference between the moment when the frame of data was generated in the buffer and the moment when the data frame is transmitted. In this case the moment when the frame of data is transmitted is used as the timing reference. Then, the computed time offset value is sent to the base station. The transmission of the time offset value can be limited to a certain logical channel.

According to a second embodiment, the object is also achieved by an arrangement in a user equipment for assisting a base station in scheduling radio resources. The base station and the user equipment are comprised within a wireless communication system. The user equipment comprises a buffer arranged to buffer frames comprising data. The user equipment may be arranged to notify the base station about data being available for transmission. The user equipment may be arranged to notify the base station by sending a scheduling request to the base station only at certain dedicated moments in time. Those certain dedicated moments in time are separated by a predetermined time interval. Further, the user equipment is arranged to send the frames comprising data. This can be after being scheduled resources by the base station. The arrangement comprises a detecting unit. The detecting unit is adapted to detect when a frame of data is generated in the buffer. Also, the arrangement comprises a computing unit. The computing unit is adapted to compute a time offset value, based on the time difference between the moment when the frame of data was generated in the buffer and a timing reference. The timing reference may be known to or possible to calculate or estimate by the user equipment and the base station. Such a timing reference may for example be the moment when the scheduling request was sent; or, if not sent, the moment when there is a next or following scheduling request opportunity. Alternatively, e.g. if the user equipment has no valid scheduling request resources, the time offset may be computed as the time difference between the moment when the frame of data was generated in the buffer and the moment when the data frame is transmitted. In this case the moment when the frame of data is transmitted is used as the timing reference. In addition, the arrangement comprises a sending unit. The sending unit is adapted to send the computed time offset value to the base station.

According to a third embodiment, the object is also achieved by a method in a base station for scheduling radio resources to a user equipment served by the base station. The base station and the user equipment are comprised within a wireless communication system. According to the present method, a time offset value is received from the user equipment. The received time offset value is associated with the moment of time when a frame of data was generated in the buffer of the user equipment. Based on the received time offset value and the timing reference, the moment of time when the frame of data was generated in the buffer of the user equipment is determined. The timing reference may be known to or can be calculated or estimated by the user equipment and the base station. Such a timing reference may for example be the moment when a scheduling request was sent by the user equipment to the base station or the moment when there is a next or following scheduling request opportunity or the moment when the data frame generated in the buffer is transmitted to the base station. Further, the buffer state of the user equipment buffer is predicted, based on or by using the determined moment of time when the frame of data was generated in the buffer of the user equipment. Based on the predicted buffer state of the user equipment buffer, radio resources are granted to the user equipment.

According to a fourth embodiment, the object is also achieved by an arrangement in a base station for scheduling radio resources to a user equipment served by the base station.

The base station and the user equipment are comprised within a wireless communication system. The base station arrangement comprises a receiving unit. The receiving unit is adapted to receive a time offset value from the user equipment. The received time offset value is associated with the moment of time when a frame of data was generated in the buffer of the user equipment. In further addition, the present base station arrangement comprises a determining unit. The determining unit is adapted to determine the moment of time when the frame of data was generated in the user equipment buffer, based on the received time offset value and a timing reference. The timing reference may be known to or can be calculated or estimated by the user equipment and the base station. Such a timing reference may for example be the moment when a scheduling request was sent by the user equipment to the base station or the moment when there is a next or following scheduling request opportunity or the moment when the data frame generated in the buffer is transmitted to the base station. The base station arrangement additionally comprises a predicting unit. The predicting unit is adapted to predict the buffer state of the user equipment buffer. The prediction is performed based on or by using the determined moment of time when the frame of data was generated in the buffer of the user equipment. The base station arrangement additionally comprises a granting unit. The granting unit is adapted to grant radio resources to the user equipment, based on the predicted buffer state of the user equipment buffer.

By estimating the data generation time of frames of data in the user equipment buffer, according to embodiments of the present methods and arrangements, it is possible to predict the user equipment buffer status or state. By using knowledge about the user equipment's service related behaviour, it may be determined which state the user equipment is transmitting in and at what point in time the user equipment has data to send. This information is according to embodiments of the present methods and arrangements used for uplink scheduling, leading to higher capacity and coverage of the wireless communication system. Also, better scheduling decisions may be made when delay is taken into account, which may be valuable in particular when scheduling delay sensitive traffic. Users will observe lower delays and resources on the physical downlink control channel PDCCH and the physical uplink shared channel PUSCH can be saved as uplink assignments will better match the current uplink buffer size.

In addition, by estimating the data generation time of data in the user equipment buffer, according to embodiments of the present methods and arrangements, it is possible to adapt the scheduling request opportunities by the eNodeB. Scheduling request opportunities can be adapted so that their distance in time from expected data arrival times of data in the buffer of the user equipment is minimized or maximized or so that they occur immediately after the expected data arrival times of data in the buffer of the user equipment.

The need for frequent explicit signalling related to buffer status or buffer state, such as scheduling requests and buffer status reports, are also reduced. Thereby, as uplink radio resources are scheduled according to the predicted user equipment buffer status, less signalling has to be made between the base station and the user equipment. As the number of grants that are transmitted within the wireless communication system limits the number of user equipments that may use the system simultaneously, it is possible to increase the load within the system by letting more user equipments participate.

Further, the overall reduced signalling resulting from the present methods and arrangements render higher capacity and better coverage within the system. Thereby an improved performance in a communication system is provided.

Furthermore, the battery consumption of the user equipment can be reduced by granting transmission resources timely after the estimated arrival of data in the buffer.

Other objects, advantages and novel features of the invention will become apparent from the following detailed description of the invention.

BRIEF DESCRIPTION OF THE DRAWINGS

The present invention will now be described more in detail in relation to the enclosed drawings, in which.

DETAILED DESCRIPTION

The invention is defined as a method and arrangement in a user equipment and as a method and arrangement in a base station, which may be put into practice in the embodiments described below. This invention may, however, be embodied in many different forms and may not be construed as limited to the embodiments set forth herein; rather, these embodiments are provided so that this disclosure will be thorough and complete, and will fully convey the scope of the invention to those skilled in the art. It is to be understood that there is no intent to limit the present methods and/or arrangements to any of the particular forms disclosed, but on the contrary, the present methods and arrangements are to cover all modifications, equivalents, and alternatives falling within the scope of the invention as defined by the claims.

Figure 1:
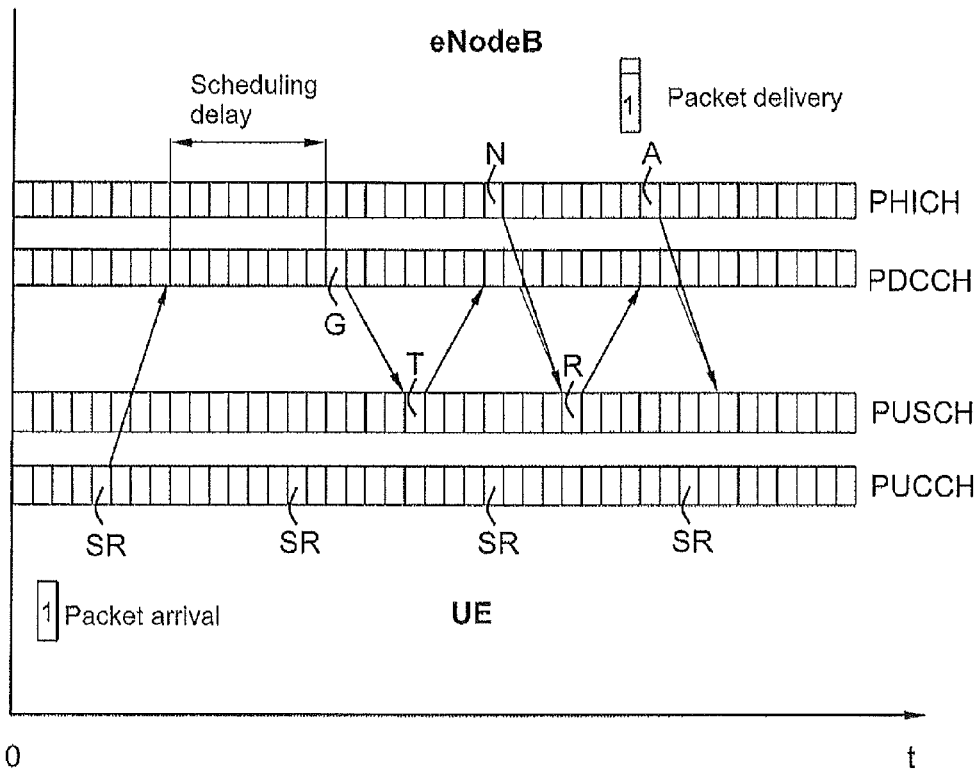
FIG. 1 is a flow chart illustrating scheduling communication according to prior art.
Figure 2:
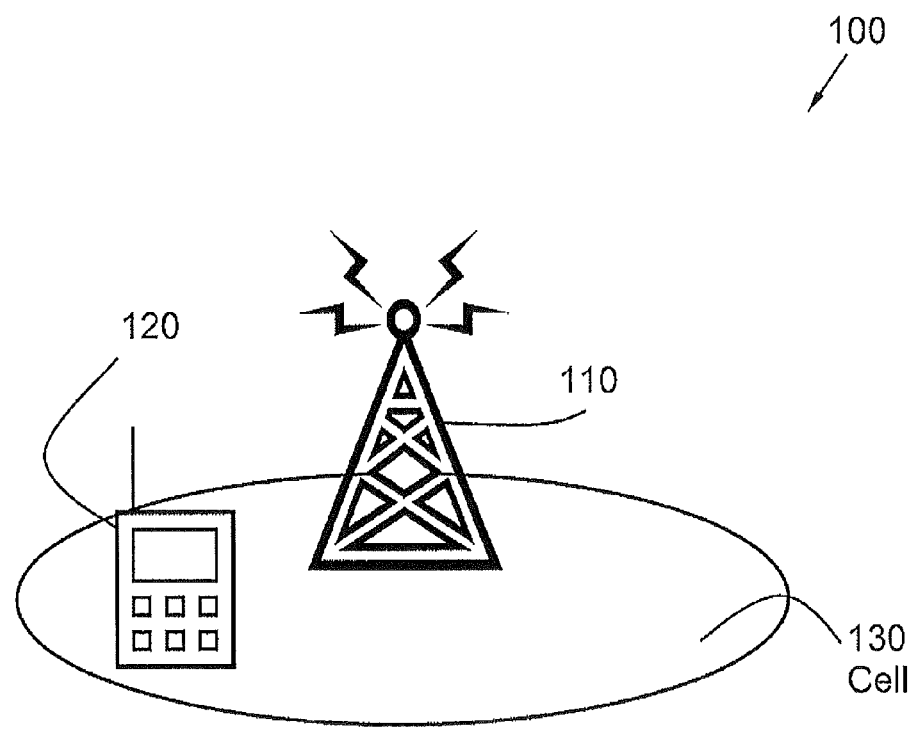
FIG. 2 is a schematic block diagram illustrating a wireless communication system.

FIG. 2 is a schematic illustration over a wireless communication system 100. The wireless communication system 100 comprises at least one base station 110 and is arranged to comprise at least one user equipment 120. The base station 110 may send and receive wireless signals to and from the user equipment 120 situated within a cell 130.

Although only one base station 110 is shown in FIG. 2, it is to be understood that another configuration of base station transceivers may be connected through, for example, other network nodes, to define the wireless communication system 100. Further, the base station 110 may be referred to as e.g. a Remote Radio Unit, an access point, a Node B, an evolved Node B (eNode B) and/or a base transceiver station, a Radio Base Station (RBS), Access Point Base Station, base station router, etc depending e.g. of the radio access technology and terminology used.

In some embodiments, the user equipment 120 may be represented by and/or referred to as a wireless communication device, a wireless communication terminal, a mobile cellular telephone, a terminal, a Personal Communications Systems terminal, a Personal Digital Assistant (PDA), a laptop, computer or any other kind of device capable of managing radio resources.

The wireless communication system 100 may be based on technologies such as e.g. Global System for Mobile Telecommunications (GSM), Enhanced Data rates for GSM Evolution (EDGE), General Packet Radio Service (GPRS), Code Division Multiple Access (CDMA), Wideband Code Division Multiple Access (WCDMA), CDMA 2000, High Speed Downlink Packet Data Access (HSDPA), High Speed Uplink Packet Data Access (HSDPA), High Data Rate (HDR) High Speed Packet Data Access (HSPA), Universal Mobile Telecommunications System (UMTS) etc, just to mention some few arbitrary and none limiting examples.

Further, as used herein, the wireless communication system 100 may further, according to some embodiments, refer to Wireless Local Area Networks (WLAN), such as Wireless Fidelity (WiFI) and Worldwide Interoperability for Microwave Access (WiMAX), Bluetooth or according to any other wireless communication technology.

However, in the exemplary embodiments in the subsequent description, the wireless communication system 100 is based on LTE.

The user equipment 120 may further communicate with other terminals not shown in FIG. 2, via the base station 110 comprised within the wireless communication system 100.

According to some embodiments of the present methods and arrangements, the user equipment 120 informs the base station 110 of how long time data has waited in the user equipment buffer before the scheduling request could be sent.

When a user equipment 120 sends its first voice frame in a burst, according to the present methods and arrangements, it may include the time it had to wait before it could send the scheduling request, which may be a dedicated scheduling request or a random access scheduling request allowing for a better estimate of the generation time. This information is in the present context referred to as the time offset. It allows the base station 110 to calculate when the data was generated in the user equipment buffer.

The base station 110 is further adapted to schedule the uplink transmissions from the user equipment 120, to the base station 110. In order to grant a particular user equipment 120 access to a particular uplink resource, a grant is generated and sent from the base station 110 to that particular user equipment 120, based on the estimated data generation time and predicted buffer state of the user equipment buffer, as will be further explained more in detail in connection with the presentation of FIG. 3.

Figure 3:
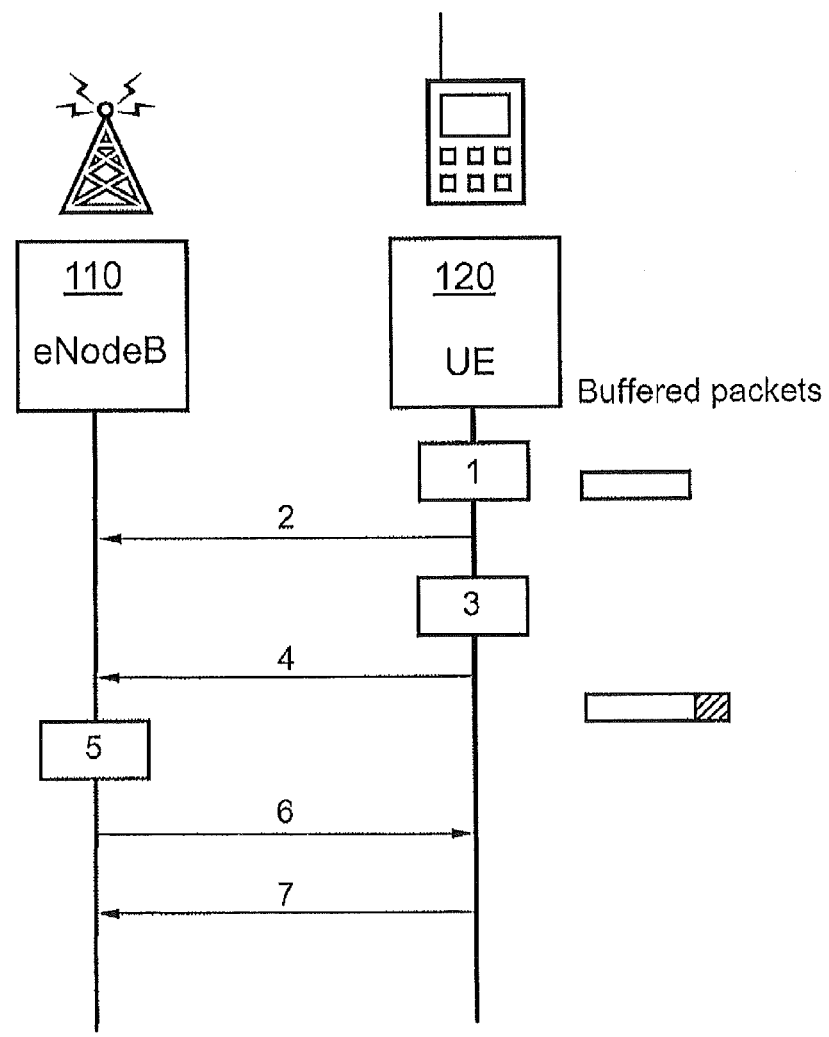
FIG. 3 is a combined flow chart and event diagram illustrating embodiments of method steps in a base station.

FIG. 3 illustrates transmissions and events involved when performing a mechanism for buffer status estimation, according to some embodiments.

When using VoIP in AMR mode, a voice frame is generated every 20 ms and a silence insertion descriptor (SID) frame every 160 ms. Thus the frames will arrive with regular spacing, therefore it is not necessary to run the present method and update the time offset more than once in a while. One possible implementation may be to send the time offset with the first voice frame of a talk burst on the PUSCH and have a timer for suppressing this option for a short time after it was sent in case the call changes direction frequently during a period. The exemplary use of VoIP in AMR mode in the present context is made only for increasing the understanding of the present methods and arrangements. However, the present methods and arrangements may be used in various other contexts and is by no means limited to be used within a VoIP context. A number of actions that may be comprised within embodiments of the present method, illustrated in FIG. 3, will now be described.

Action 1

Data, or frames comprising data, is generated and stored in the buffer of the user equipment 120. This is detected by a detection unit within the user equipment 120.

Action 2

According to some embodiments a scheduling request may be sent to the base station 110, requesting resources for sending the data or frames of data in the buffer of the user equipment 120 to the base station 110. This step is optional.

Action 3

A time offset value may be computed by the user equipment 120, based on the time difference between the moment when the frame of data was generated in the buffer and the moment when the scheduling request was sent. Alternatively, the time offset can be calculated as a time difference between the moment when the frame of data was generated and the moment of the next or following scheduling request opportunity or as a time difference between the moment when the frame of data was generated and the moment when the corresponding data frame is transmitted.

The moment when the scheduling request was sent, the moment of the next scheduling request opportunity and the moment when the generated data frame is transmitted are all examples of a timing reference that is known to or can be calculated or estimated by the user equipment 120 and the base station 110. Generally, the time offset value can be computed based on the time difference between the time, or moment, at which data, or a data frame, is generated in the buffer of the UE 120 and the timing reference.

Most delay sensitive services would require a rather short D-SR interval, therefore 5 bits for indicating the time offset may be sufficient, according to some embodiments. By using encoding techniques such as delta encoding it may be possible to reduce the resolution even further.

According to some embodiments, the time offset value, e g the time the data waited in the queue before the scheduling request was sent, can be piggybacked on the data similar to a buffer status report (BSR) when data is sent. It may however require a new MAC control element. Alternatively, the time offset value could be transmitted in the header of a data element. Or a physical control channel could be used to convey the information to the base station.

The transmission of the time offset value can be limited to a certain logical channel, according to some embodiments.

Action 4

The computed time offset value is sent to the base station 110. As the time offset value is received at the base station 110, according to some embodiments, it can be associated with the received scheduling request from the user equipment 120.

Action 5

At the base station 110 the moment of time when the frame of data was generated in the buffer of the user equipment is determined based on the received time offset value and the timing reference. Based on the determined moment of time when the frame of data was generated in the buffer of the user equipment 120, the buffer state of the user equipment buffer may then be predicted. Also, the base station 110 can adjust the priority of the user equipment 120 based on the improved delay estimate.

Action 6

Based on the predicted buffer state of the user equipment buffer, radio resources are granted to the user equipment 120 and a grant is sent to the user equipment 120.

Action 7

Receiving the grant from the base station 110, the user equipment 120 may send data buffered in the buffer to the base station 110.

Figure 4:
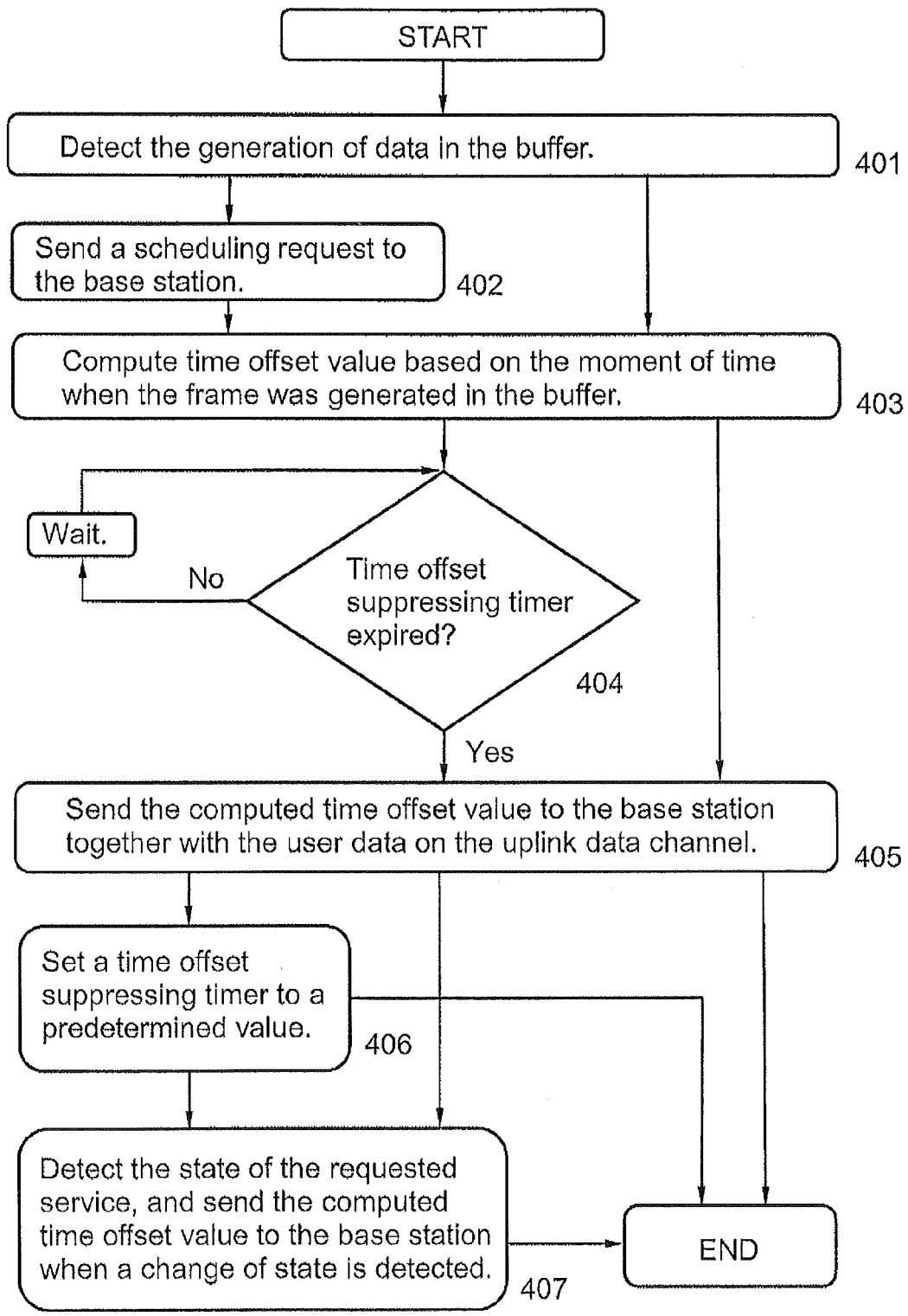
FIG. 4 is a flow chart illustrating embodiments of method steps in a user equipment.

FIG. 4 is a flow chart illustrating embodiments of method steps 401-407 performed in a user equipment 120. The method aims at assisting a base station 110 in scheduling radio resources. The base station 110 and the user equipment 120 are comprised within a wireless communication system 100. The user equipment 120 comprises a buffer arranged to buffer frames comprising data. The user equipment 120 is arranged to send data or the frames comprising data after being scheduled resources by the base station 110.

The user equipment 120 may be arranged to send a scheduling request to the base station 110 only at certain scheduling request opportunities, which are separated by a predetermined time interval and to send data or frames of data after being scheduled resources by the base station 110.

The user equipment 130 may be configured to request a service comprising different states. Thus the requested service may according to some embodiments comprise different states. The different states may comprise e.g. a talk state and a silence state.

To appropriately assist a base station 110 in scheduling radio resources, the method may comprise a number of method steps 401-407.

It is however to be noted that some of the described method steps 401-407 are optional and only comprised within some embodiments. Further, it is to be noted that the method steps 401-407 may be performed in any arbitrary chronological order and that some of them, e.g. step 401 and step 403, or even all steps may be performed simultaneously or in an altered, arbitrarily rearranged, decomposed or even completely reversed chronological order. The method may comprise the following steps:

Step 401

It is detected when data is generated in the buffer. Thereby, when a frame of data is generated in the buffer, the data generation is detected.

Step 402

This step is optional and may only be performed within some embodiments.

A scheduling request may be sent to the base station 110. In the scheduling request, the user equipment 120 may request to send the frame of data generated in the buffer to the base station, for possible further forwarding to the recipient of the generated data, according to some embodiments.

Step 403

A time offset value is computed, based on the time difference between the moment when the frame of data was generated in the buffer and the timing reference, e g the moment when the data frame transmission occurs. The moment when the data frame transmission occurs may be the moment in time when the frame of data that was generated in the buffer is actually sent to the base station 110. This time offset value may vary from no time offset at all up to the size of the scheduling request interval. Alternatively or in other circumstances, the time offset may be computed based on the time difference between the moment when the frame of data was generated in the buffer and the moment when the next or following scheduling request opportunity is available or the time difference between the moment when the frame of data was generated in the buffer and the moment when the scheduling request was sent. In these cases the timing reference is the moment when the next or following scheduling request opportunity is available and the moment when the scheduling request was sent respectively. The timing reference used may depend on the communication that is about to take place when the frame of data is generated.

The step of computing the time offset value may be based on the time difference between the moment when the frame of data was generated in the buffer and the following scheduling request opportunity.

Optionally, a new time offset value may be computed and sent to the base station 110 if the computed time offset value has changed when data arrive to the buffer, according to some embodiments. In other words, the computed time offset value may in some embodiments be sent to the base station 110 if it has changed compared to a previous computed time offset value.

According to some embodiments, the computed time offset value may be sent to the base station 110 together with the frame of data. Further, according to some embodiments, transmission of the time offset value may be limited to certain logical channels.

Step 404

This step is optional and may only be performed within some embodiments.

A time offset suppressing timer may be checked, whether the time offset suppressing timer has expired before performing the step of sending the time offset value. If the time offset suppressing timer has expired, the time offset value may be sent to the base station 110 according to some embodiments.

If the time offset suppressing timer has not expired, no sending of the time offset value is performed.

Step 405

The computed time offset value is sent to the base station 110.

The computed time offset value may according to some embodiments be sent to the base station 110 when a change of state is detected. Further, according to some embodiments the time offset value may be limited to be transmitted on certain logical channels.

A new computed time offset value may optionally be sent to the base station 110 if the new computed time offset value has changed, compared to a previous computed time offset value, when data arrive to the buffer, according to some embodiments.

The computed time offset value may optionally be sent to the base station 110 together with the frame of data. The computed time offset value may be sent either on a physical control channel, in a control element or in the header of the data unit, according to some embodiments.

Step 406

This step is optional and may only be performed within some embodiments.

A time offset suppressing timer may be set to a predetermined value after the step of sending the computed time offset value to the base station 110, according to some embodiments. Thereby a very frequent updating of time offset value may be suppressed.

Step 407

This step is optional and may only be performed within some embodiments.

The state of the requested service may be detected. The different states may comprise e.g. a talk state and a silence state. The computed time offset value may be sent to the base station 110 when a change of state is detected.

Figure 5:
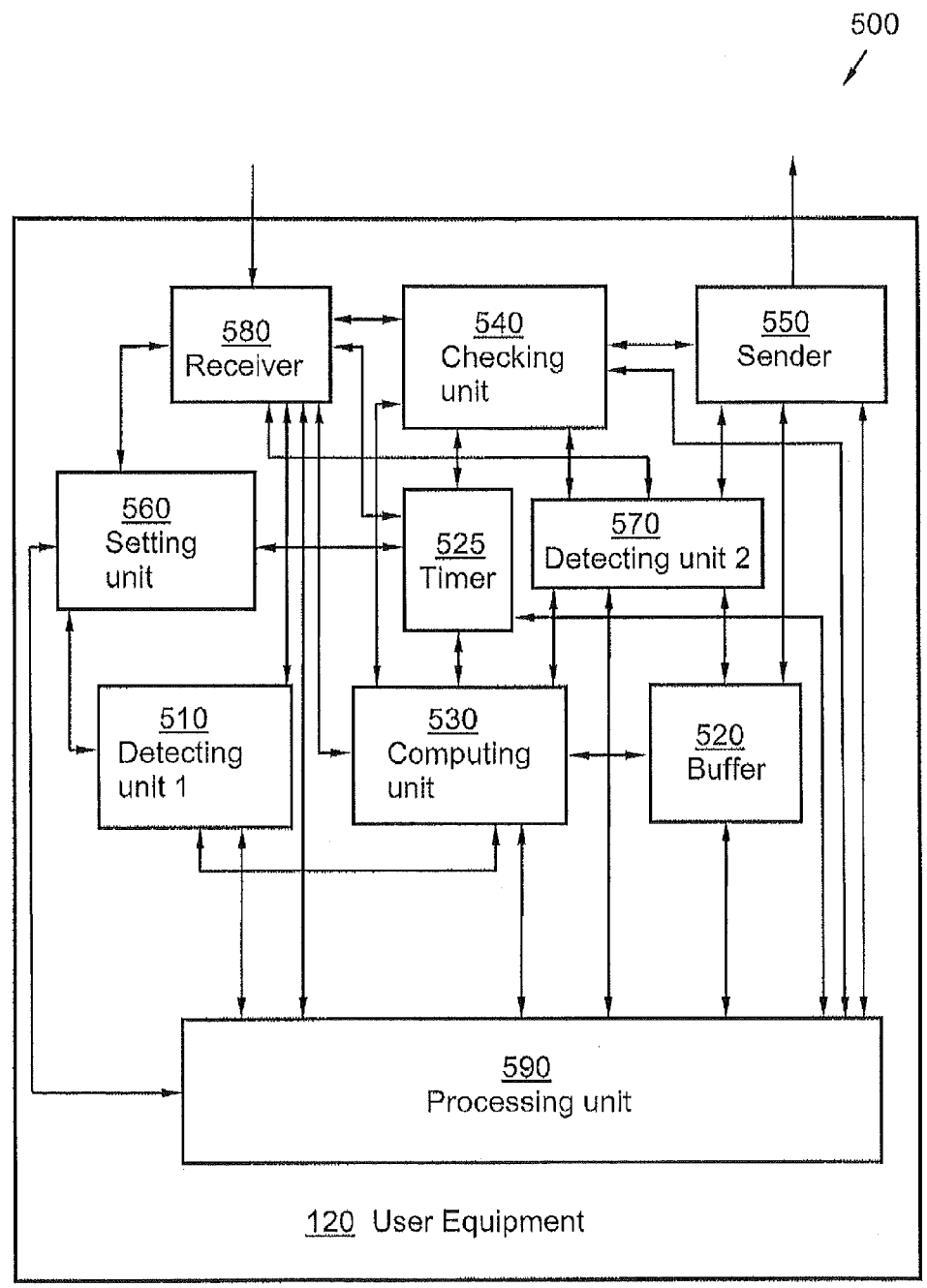
FIG. 5 is a block diagram illustrating embodiments of an arrangement in a user equipment.

FIG. 5 is a block diagram illustrating embodiments of an arrangement 500 situated in a user equipment 120 for assisting a base station 110 in scheduling radio resources. The arrangement 500 is configured to perform the method steps 401-407 for assisting a base station 110 in scheduling radio resources. The base station 110 and the user equipment 120 are comprised within a wireless communication system 100, the user equipment 120 comprising a buffer 520. The buffer 520 is arranged to buffer frames comprising data. The user equipment 120 is arranged to send data after being scheduled resources by the base station 110.

The user equipment 120 may further optionally be arranged to send a scheduling request to the base station 110 at certain dedicated moments in time. The certain dedicated moments in time are separated by a predetermined time interval. Further, the user equipment 120 may be arranged to send data on resources scheduled by the base station 110.

For the sake of clarity, any internal electronics of the arrangement 500, not completely necessary for understanding the present method has been omitted from FIG. 5.

The arrangement 500 comprises a detecting unit 510. The detecting unit 510 is adapted to detect when data or a frame of data is generated in the buffer 520. Also, the arrangement 500 comprises a computing unit 530. The computing unit 530 is adapted to compute a time offset value based on the time difference between the moment when the frame of data was generated in the buffer 520 and the timing reference, e g the moment when the data frame is transmitted. However, the computing unit 530 may further be adapted to compute a time offset value based on the time difference between the moment when the frame of data was generated in the buffer 520 and the moment when there is a scheduling request opportunity, or the time difference between the moment when the frame of data was generated in the buffer and the moment when a scheduling request was sent. In these cases the timing reference is the moment when the next or following scheduling request opportunity is available and the moment when the scheduling request was sent respectively. The timing reference used may depend on the communication that is about to take place when the frame of data is generated. The user equipment 120 and the base station 110 may have a common set of rules for what timing reference to apply in different situations.

In addition, the arrangement 500 comprises a sending unit 550. The sending unit 550 is adapted to send the computed time offset value to the base station 110. According to some embodiments the sending unit 550 may be configured to send a scheduling request to the base station 110.

The arrangement 500 may optionally further comprise, according to some embodiments, a time offset suppressing timer 525. The optional timer 525 may be used to control the generation or computation and sending of time offset values to the base station 110. The timer may function as a count down timer, counting down from a specified time interval. According to some embodiments, the timer 525 may be adapted or set to a predetermined value.

In further addition, the arrangement 500 may comprise a checking unit 540. The optional checking unit 540 may be adapted to check if the time offset suppressing timer 525 has expired.

Furthermore, the arrangement 500 may comprise a second detecting unit 570. The second detecting unit 570 may be adapted to detect the state of the requested service.

Still further, the arrangement 500 optionally may comprise, according to some embodiments, a receiving unit 580. The receiving unit 580 may be adapted to receive radio signals.

The arrangement 500 may according to some embodiments further comprise a processing unit 590. The processing unit 590 may be represented by e.g. a Central Processing Unit (CPU), a processor, a microprocessor, or other processing logic that may interpret and execute instructions. The processing unit 590 may perform all data processing functions for inputting, outputting, and processing of data including data buffering and device control functions, such as call processing control, user interface control, or the like.

It is to be noted that the described units 510-590 comprised within the arrangement 500 may be regarded as separate logical entities, but not with necessity as separate physical entities. Any, some or all of the units 510-590 may be comprised or co-arranged within the same physical unit. However, in order to facilitate the understanding of the functionality of the arrangement 500, the comprised units 510-590 are illustrated as separate units in FIG. 5.

Thus the transmitting unit 550 and e.g. the receiving unit 580 may, according to some embodiments, be comprised within one physical unit, a transceiver, which may comprise a transmitter circuit and a receiver circuit, which respectively transmits outgoing radio frequency signals to base station 110 and receives incoming radio frequency signals from the base station 110 via an optional antenna. The antenna may be an embedded antenna, a retractable antenna or any other arbitrary antenna without departing from the scope of the present arrangements. The radio frequency signals transmitted between the base station 110 and the user equipment 120 may comprise both traffic and control signals e.g. paging signals/messages for incoming calls, which may be used to establish and maintain a voice call communication with another party or to transmit and/or receive data, such as SMS, e-mail or MMS messages, etc.

Computer Program Product in the User Equipment 120

The method steps 401-407 in the user equipment 120 may be implemented through one or more processor units 590 in the user equipment 120, together with computer program code for performing the functions of the present method steps 401-407. Thus a computer program product, comprising instructions for performing the method steps 401-407 in the user equipment 120 may assist a base station 110 in scheduling radio resources.

The computer program product mentioned above may be provided for instance in the form of a data carrier carrying computer program code for performing the method steps according to the present solution when being loaded into the processor unit 590. The data carrier may be e.g. a hard disk, a CD ROM disc, a memory stick, an optical storage device, a magnetic storage device or any other appropriate medium such as a disk or tape that can hold machine readable data. The computer program code can furthermore be provided as pure program code on a server and downloaded to the user equipment 120 remotely, e.g. over an Internet or an intranet connection.

Further, a computer program product comprising instructions for performing at least some of the method steps 401-407 may be used for implementing the previously described method in the user equipment 120 for assisting a base station 110 in scheduling radio resources, when the computer program product is run on a processing unit 590 comprised within the user equipment 120.

Figure 6:
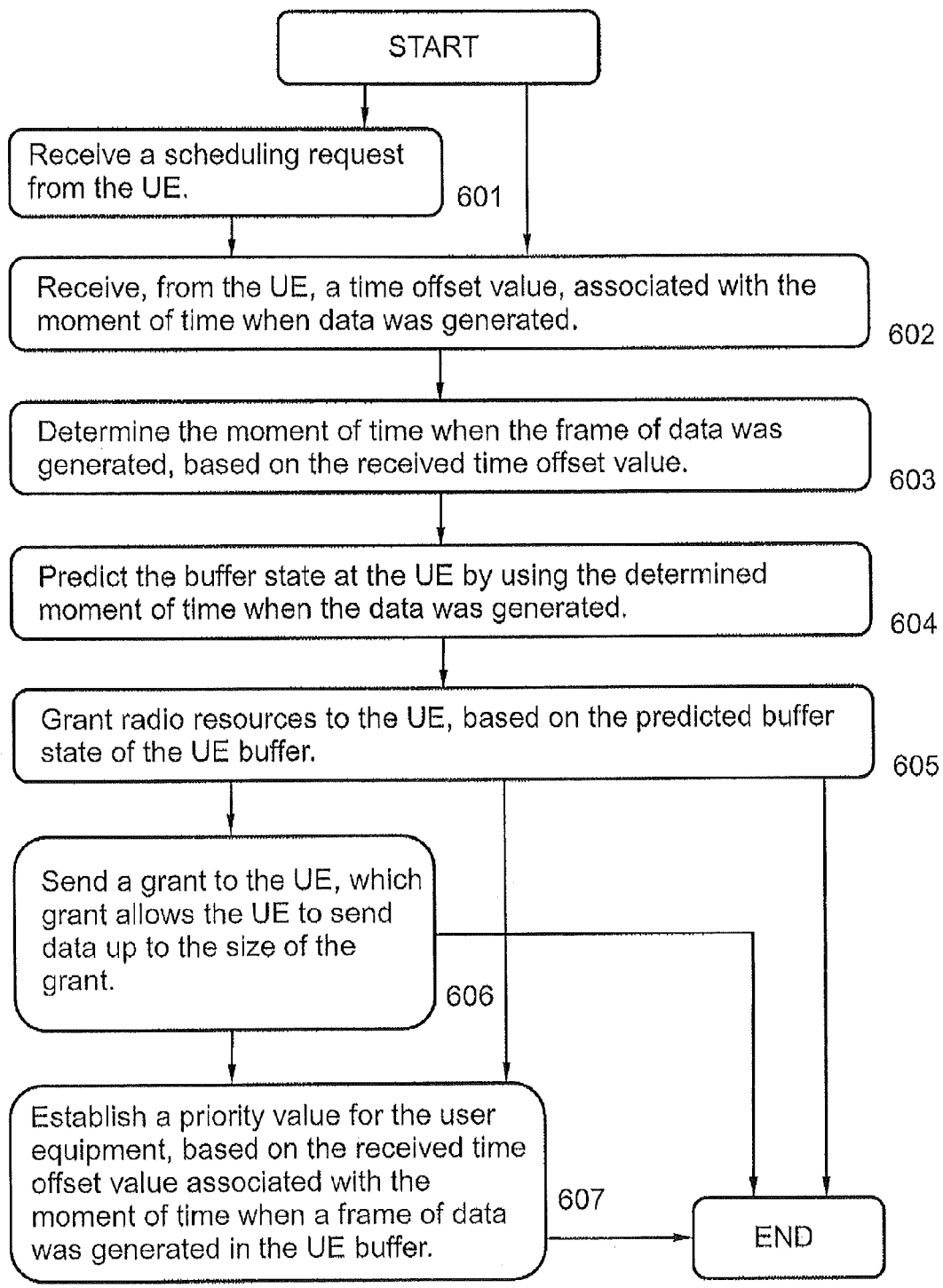
FIG. 6 is a flow chart illustrating embodiments of method steps in a base station.

FIG. 6 is a flow chart illustrating embodiments of method steps 601-607 performed in a base station 110. The method aims at scheduling radio resources to a user equipment 120, served by the base station 110. The base station 110 and the user equipment 120 are comprised within a wireless communication system 100.

The radio resources may be granted so that they become valid after the next expected arrival of a data in the user equipment's buffer 520 and before the following occurrence of a scheduling request opportunity, according to some embodiments.

The radio resources may optionally be granted so that the delay from data generation, or generation of the frame of data, in the user equipment buffer 520 to data transmission, or transmission of the frame of data, to the base station 110 is minimized.

The scheduling request opportunities may be adapted based on the received time offset value.

According to some embodiments the scheduling request opportunities may be adapted so that their distance in time from expected data arrival times of data in the buffer 520 of the user equipment 120 is minimized or maximized.

Further, according to some embodiments the scheduling request opportunities may be adapted so that they occur immediately after the expected data arrival times of data in the buffer 520 of the user equipment 120.

The user equipment 120 may optionally be arranged to send a scheduling request to the base station 110 at certain dedicated moments in time, which are separated by a predetermined time interval and to send data after being scheduled resources by the base station 110. The requested service may according to some embodiments comprise different states, such as e.g. a talk state and a silence state.

To appropriately schedule radio resources to the user equipment 120, the method may comprise a number of method steps 601-607.

It is however to be noted that some of the described method steps 601-607 are optional and only comprised within some embodiments. Further, it is to be noted that the method steps 601-607 may be performed in any arbitrary chronological order and that some of them, e.g. step 601 and step 602, or even all steps may be performed simultaneously or in an altered, arbitrarily rearranged, decomposed or even completely reversed chronological order. The method may comprise the following steps:

Step 601

This step is optional and may only be performed within some embodiments.

A scheduling request may be received from the user equipment 120.

Step 602

A time offset value is received from the user equipment 120, which value is associated with the moment of time when a frame of data was generated in the buffer 520 of the user equipment 120.

The time offset value may according to some embodiments be the time that has passed from the moment in time when the frame of data was generated in the buffer of the user equipment 120, to the moment in time when the frame of data was transmitted to the base station 110. The time offset value may in other circumstances be based on the time difference between the moment when the frame of data was generated in the buffer 520 and the moment when there is a scheduling request opportunity, or the time difference between the moment when the frame of data was generated in the buffer and the moment when a scheduling request was sent. How the time offset value is computed may depend on the communication that is about to take place when the frame of data is generated.

The time offset value may according to some embodiments be received from the user equipment 120 together with the frame of data.

Step 603

The moment of time when the frame of data was generated in the buffer 520 of the user equipment 120 is determined, based on the received time offset value and a timing reference. The timing reference is known to or can be calculated or estimated by the user equipment and the base station. Such a timing reference may for example be the moment when a scheduling request was sent by the user equipment or received by the base station. It may further be the moment when there is a next scheduling request opportunity or the moment when the data frame generated in the buffer is transmitted to the base station or received by the base station. The timing reference used may depend on the communication that is about to take place when the frame of data is generated. The user equipment 120 and the base station 110 may have a common set of rules for what timing reference to apply in different situations.

Thus the moment of time when the frame of data was generated in the buffer 520 of the user equipment 120 may be determined by subtracting the received time offset value from the timing reference applied, e g moment in time when the data frame was received from the user equipment 120, or may be estimated by the base station 110.

According to some embodiments may the system delay be taken into account when calculating or estimating the moment of time when the frame of data was generated in the buffer 520 of the user equipment 120.

Step 604

The buffer state of the user equipment buffer 520 is predicted by using the determined moment of time when the frame of data was generated in the buffer 520 of the user equipment 120.

Step 605

Radio resources are granted to the user equipment 120, based on the predicted buffer state of the user equipment buffer 520.

For example resources may be granted to the user equipment 120 at a certain interval, such as e.g. every 20 ms, or every 160 ms. The determination of appropriate time interval may further be based on the service mode. Thus for example, when using VoIP in AMR mode, the time interval may be set to 20 ms. When using VoIP in silent mode, the time interval may be set to 160 ms.

Step 606

This step is optional and may only be performed within some embodiments.

A grant may be sent to the user equipment 120, which grant allows the user equipment 120 to send data up to the size of the grant.

Step 607

This step is optional and may only be performed within some embodiments.

A priority value for the user equipment 120 may be established, based on the received time offset value associated with the moment of time when a frame of data was generated in the buffer 520 of the user equipment 120.

Figure 7:
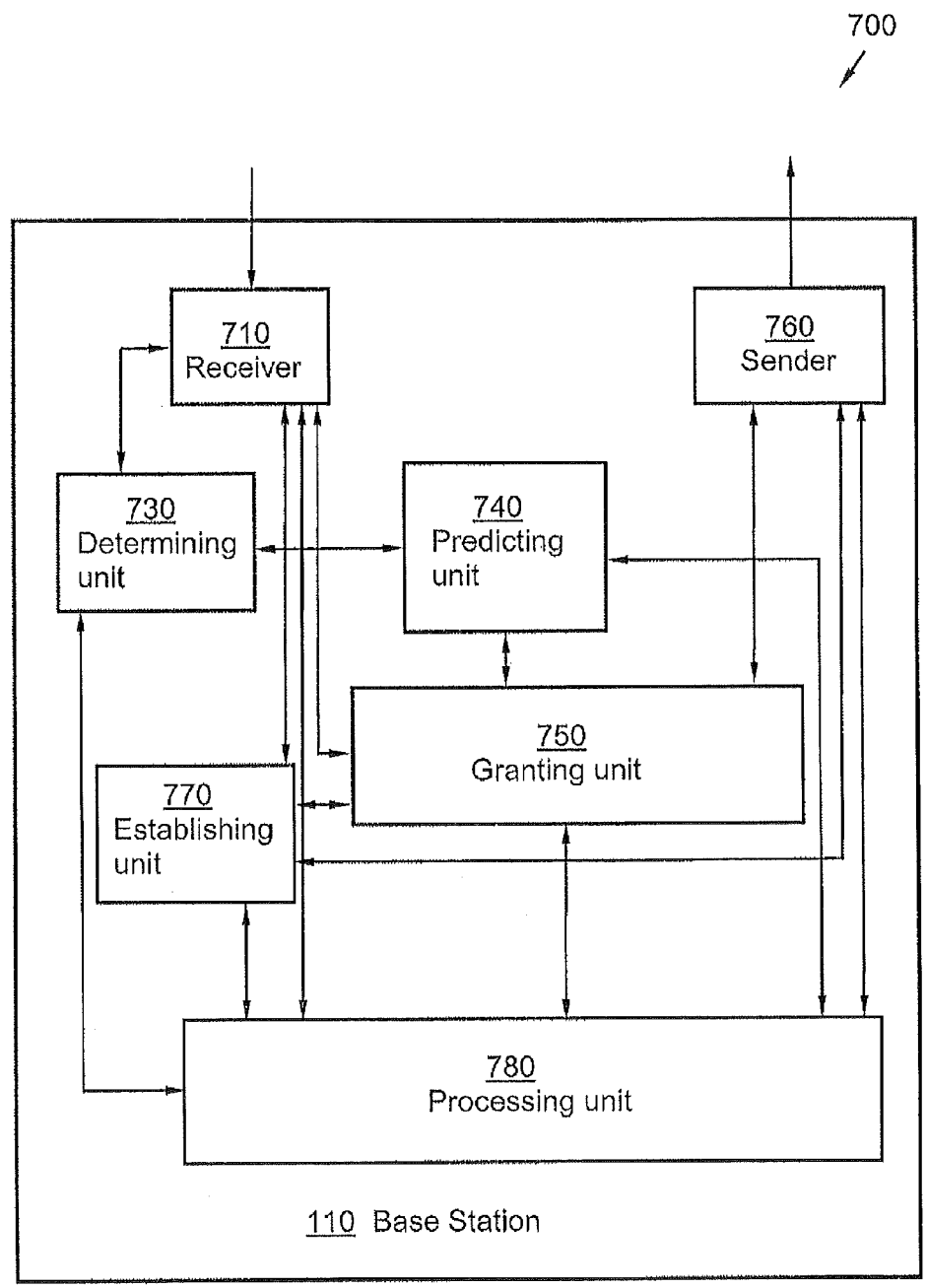
FIG. 7 is a block diagram illustrating embodiments of an arrangement in a base station.

FIG. 7 is a block diagram illustrating embodiments of an arrangement 700 situated in a base station 110. The arrangement 700 is configured to perform the method steps 601-607 for scheduling radio resources to a user equipment 120, served by the base station 110. The base station 110 and the user equipment 120 are comprised within a wireless communication system 100.

For the sake of clarity, any internal electronics of the arrangement 700, not completely necessary for understanding the present method has been omitted from FIG. 7.

The arrangement 700 comprises a receiving unit 710. The receiving unit 710 is adapted to receive a scheduling request and a time offset value which value is associated with the moment of time when a frame of data was generated in the buffer 520 of the user equipment 120. Also, the arrangement 700 comprises a determining unit 730. The determining unit 730 is adapted to determine the moment of time when the frame of data was generated in the buffer 520 of the user equipment 120, based on the received time offset value and a timing reference. The timing reference may be known to or can be calculated or estimated by the user equipment and the base station. Such a timing reference may for example be the moment when a scheduling request was sent by the user equipment or received by the base station. It may further be the moment when there is a next scheduling request opportunity or the moment when the data frame generated in the buffer is transmitted to the base station or received by the base station. The timing reference used may depend on the communication that is about to take place when the frame of data is generated. The user equipment 120 and the base station 110 may have a common set of rules for what timing reference to apply in different situations. In addition, the arrangement 700 comprises a predicting unit 740. The predicting unit 740 is adapted to predict the buffer state of the user equipment buffer 520 by using the determined moment of time when the frame of data was generated in the buffer 520 of the user equipment 120. Furthermore, additionally, the arrangement 700 comprises a granting unit 750. The granting unit 750 is adapted to grant radio resources to the user equipment 120, based on the predicted buffer state of the user equipment buffer 520, i.e. when there will be data generated in the buffer, to be sent to the base station 110.

The arrangement 700 may optionally further comprise a sending unit 760. The sending unit 760 is adapted to send a grant to the user equipment 120. The grant allows the user equipment 120 to send data up to the size of the grant.

Furthermore, the arrangement 700 may comprise an establishing unit 770. The establishing unit 770 may be adapted to establish a priority value for the user equipment 120, based on the received time offset value associated with the moment of time when a frame of data was generated in the buffer 520 of the user equipment 120.

The arrangement 700 may according to some embodiments further comprise a processing unit 780. The processing unit 780 may be represented by e.g. a Central Processing Unit (CPU), a processor, a microprocessor, or other processing logic that may interpret and execute instructions. The processing unit 780 may perform all data processing functions for inputting, outputting, and processing of data including data buffering and device control functions, such as call processing control, user interface control, or the like.

It is to be noted that the described units 710-780 comprised within the arrangement 700 may be regarded as separate logical entities, but not with necessity as separate physical entities. Any, some or all of the units 710-780 may be comprised or co-arranged within the same physical unit. However, in order to facilitate the understanding of the functionality of the arrangement 700, the comprised units 710-780 are illustrated as separate units in FIG. 7.

Thus the transmitting unit 760 and e.g. the receiving unit 710 may, according to some embodiments, be comprised within one physical unit, a transceiver, which may comprise a transmitter circuit and a receiver circuit, which respectively transmits outgoing radio frequency signals to the user equipment 120 and receives incoming radio frequency signals from the user equipment 120 via an optional antenna. The antenna may be an embedded antenna, a retractable antenna or any other arbitrary antenna without departing from the scope of the present arrangements. The radio frequency signals transmitted between the base station 110 and the user equipment 120 may comprise both traffic and control signals e.g. paging signals/messages for incoming calls, which may be used to establish and maintain a voice call communication with another party or to transmit and/or receive data, such as SMS, e-mail or MMS messages, etc.

Computer Program Product in the Base Station 110

The method steps 601-607 in the base station 110 may be implemented through one or more processor units 780 in the base station 110, together with computer program code for performing the functions of the present method steps 601-607. Thus a computer program product, comprising instructions for performing the method steps 601-607 in the base station 110 may schedule radio resources to a user equipment 120, served by the base station 110.

The computer program product mentioned above may be provided for instance in the form of a data carrier carrying computer program code for performing the method steps according to the present solution when being loaded into the processor unit 780. The data carrier may be e.g. a hard disk, a CD ROM disc, a memory stick, an optical storage device, a magnetic storage device or any other appropriate medium such as a disk or tape that can hold machine readable data. The computer program code can furthermore be provided as pure program code on a server and downloaded to the base station 110 remotely, e.g. over an Internet or an intranet connection.

Further, a computer program product comprising instructions for performing at least some of the method steps 601-607 may be used for implementing the previously described method in the base station 110 for scheduling radio resources to the user equipment 120, when the computer program product is run on the processing unit 780 comprised within the base station 110.

The terminology used in the detailed description of the particular exemplary embodiments illustrated in the accompanying drawings is not intended to be limiting of the invention.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

The invention claimed is:

1. A method in a wireless communication system for scheduling radio resources, the wireless communication system comprising a base station and a user equipment, the user equipment comprising a buffer configured to buffer frames comprising data, and the user equipment-configured to send the frames comprising data after being scheduled resources by the base station, the method comprising:

detecting, in the user equipment, when a frame of data is generated in the buffer;

computing, in the user equipment, a time offset value based on a time difference between when the frame of data was generated in the buffer and a timing reference;

sending, by the user equipment, the computed time offset value to the base station;

determining by the base station, when the frame of data was generated in the buffer of the user equipment based on the computed time offset value and the timing reference;

predicting, by the base station, a buffer state of the buffer of the user equipment based on when the frame of data was generated in the buffer of the user equipment; and granting, by the base station radio resources to the user equipment, based on the predicted buffer state of the buffer of the user equipment, wherein the timing reference is one of when the generated frame of data is transmitted to the base station, a next scheduling request opportunity and when a scheduling request was sent to the base station.

2. The method of claim 1, wherein the timing reference is one of a timing reference known by the base station, a timing reference calculated by the base station and a timing reference estimated by the base station.

3. The method of claim 1, wherein the user equipment is configured to:
send a scheduling request to the base station only at certain scheduling request opportunities, the scheduling request opportunities being separated by a predetermined time interval; and
send data after being scheduled resources by the base station;
wherein the timing reference is a following scheduling request opportunity that follows when the frame of data was generated in the buffer.

4. The method of claim 1, further comprising sending, by the user equipment, a scheduling request to the base station.

5. The method of claim 1, further comprising:
setting, by the user equipment, a time offset suppressing timer to a predetermined value after sending the computed time offset value to the base station; and
checking, by the user equipment, if the time offset suppressing timer has expired before sending the computed time offset value.

6. The method of claim 1, wherein computing the time offset value- and sending the computed time offset value is limited to certain logical channels.

7. The method of claim 1, wherein the user equipment is configured to request a service comprising different states, the method further comprising:
detecting, by the user equipment, one of the different states of the requested service,
wherein sending the computed time offset value to the base station comprises sending the computed time offset value to the base station when a change of state is detected.

8. The method of claim 1, further comprising:
computing a new time offset value, by the user equipment; and
sending the new time offset value to the base station if the computed time offset value has changed when data arrive to the buffer.

9. The method of claim 1, wherein the computed time offset value is sent, by the user equipment, to the base station together with the frame of data.

10. The method of claim 1, wherein the computed time offset value is sent, by the user equipment, on a physical control channel, in a control element or in the header of the data unit.

11. A wireless communication system for scheduling radio resources, the wireless communication system comprising:
a base station comprising a receiving unit configured to receive a time offset value; and a user equipment arranged to send frames of data after being scheduled resources by the base station, the user equipment comprising:
a buffer configured to buffer frames comprising data;
a detecting unit configured to detect when a frame of data is generated in the buffer;
a computing unit configured to compute the time offset value based on a time difference between when the frame of data was generated in the buffer and a timing reference;
a sending unit, adapted to send the computed time offset value to the base station;
a determining unit configured to determine when the frame of data was generated in the buffer of the user equipment, based on the computed time offset value and the timing reference;
a predicting unit configured to predict a buffer state of the buffer of the user equipment based on when the frame of data was generated in the buffer of the user equipment; and
a granting unit configured to grant radio resources to the user equipment-based on the predicted buffer state of the buffer of the user equipment,
wherein the timing reference is one of when the generated frame of data is transmitted to the base station, a next scheduling request opportunity and when a scheduling request was sent to the base station.

12. A method in a base station for scheduling radio resources to a user equipment served by the base station, the base station and the user equipment being included in a wireless communication system, the method comprising:
receiving, from the user equipment, a time offset value based on the time difference between when the frame of data was generated in the buffer of the user equipment and a timing reference;
determining when the frame of data was generated in the buffer of the user equipment based on the received time offset value and the timing reference;
predicting a buffer state of the buffer of the user equipment based on when the frame of data was generated in the buffer of the user equipment; and
granting radio resources to the user equipment based on the predicted buffer state of the buffer of the user equipment,
wherein the timing reference is one of when the generated frame of data is transmitted to the base station, a next scheduling request opportunity and when a scheduling request was sent to the base station.

13. The method of claim 12, wherein the timing reference is one of a timing reference known by the base station, a timing reference calculated by the base station and a timing reference estimated by the base station.

14. The method of claim 12, further comprising receiving a scheduling request from the user equipment.

15. The method of claim 12, wherein the radio resources are granted so that they become valid after a next expected arrival of a data in the buffer of the user equipment and before a following occurrence of a scheduling request opportunity.

16. The method of claim 12, wherein the radio resources are granted so that a delay from the generation of the frame of data in the user equipment buffer to the transmission of the frame of data is reduced.

17. The method of claim 12, further comprising adapting scheduling request opportunities based on the received time offset value.

18. The method of according to claim 17, further comprising adapting the scheduling request opportunities so that a distance in time from expected data arrival times of data in the buffer of the user equipment is one of minimized and maximized.

19. The method of claim 17, further comprising adapting the scheduling request opportunities so that they occur immediately after the expected data arrival times of data in the buffer of the user equipment.

20. The method of claim 12, wherein receiving the time offset value comprises receiving the time offset value from the user equipment together with the frame of data.

21. The method of claim 12, further comprising sending a grant to the user equipment, the grant allowing the user equipment to send data up to a size of the grant.

22. The method of claim 12, further comprising establishing a priority value for the user equipment based on the received time offset value associated with when the frame of data was generated in the buffer of the user equipment.

23. A base station for scheduling radio resources to a user equipment served by the base station, the base station and the user equipment being included in a wireless communication system, the base station comprising:

a receiving unit, configured to receive, from the user equipment, a time offset value based on a time difference between when the frame of data was generated in the buffer of the user equipment and a timing reference;

a determining unit configured to determine when the frame of data was generated in the buffer of the user equipment based on the received time offset value and the timing reference;

a predicting unit configured to predict a buffer state of the buffer of the user equipment based on when the frame of data was generated in the buffer of the user equipment; and a granting unit configured to grant radio resources to the user equipment based on the predicted buffer state of the buffer of the user equipment, wherein the timing reference is one of when the generated frame of data is transmitted to the base station, a next scheduling request opportunity and when a scheduling request was sent to the base station.

\* \* \* \* \*

UNITED STATES PATENT AND TRADEMARK OFFICE
CERTIFICATE OF CORRECTION

PATENT NO. : 8,837,403 B2  
APPLICATION NO. : 13/392224  
DATED : September 16, 2014  
INVENTOR(S) : Stattin et al.

Page 1 of 1

It is certified that error appears in the above-identified patent and that said Letters Patent is hereby corrected as shown below:

Title Page (75), under "Inventors", in Column 1, Line 1, delete "Spanga" and insert -- Sollentuna --, therefor.

In the Specification

In Column 7, Line 8, delete "(HSDPA)," and insert -- (HSUPA), --, therefor.

In Column 7, Line 15, delete "(WiFI)" and insert -- (WiFi) --, therefor.

In Column 9, Line 19, delete "equipment 130" and insert -- equipment 120 --, therefor.

In the Claims

In Column 17, Line 40, in Claim 6, delete "value- and" and insert -- value and --, therefor.

In Column 18, Line 66, in Claim 18, delete "of according to claim" and insert -- of claim --, therefor.

Signed and Sealed this
Nineteenth Day of May, 2015

Michelle K. Lee
*Director of the United States Patent and Trademark Office*